United States Patent [19]

Ito et al.

[11] Patent Number: 4,839,654
[45] Date of Patent: Jun. 13, 1989

[54] SYSTEM FOR DETECTING UNDERGROUND OBJECTS

[75] Inventors: Masaaki Ito; Shiro Odagiri, both of Tokyo; Kouji Maeda; Yasuhiro Uekubo; Aiko Jitumori; Teruo Usami, all of Hyogo, Japan

[73] Assignees: The Tokyo Electric Power Co., Inc.; Mitsubishi Denki Kabushiki Kaisha, both of Tokyo, Japan

[21] Appl. No.: 166,471

[22] Filed: Mar. 10, 1988

[30] Foreign Application Priority Data

Mar. 11, 1987 [JP] Japan .................................. 62-55680
Mar. 11, 1987 [JP] Japan .................................. 62-55682

[51] Int. Cl.$^4$ ........................ G01S 13/90; G01V 3/12
[52] U.S. Cl. ........................................ 342/22; 342/25
[58] Field of Search .................... 342/22, 25; 324/326, 324/329

[56] References Cited

U.S. PATENT DOCUMENTS

| | | | |
|---|---|---|---|
| 4,062,010 | 12/1977 | Young et al. ........................ | 342/22 |
| 4,677,438 | 6/1987 | Michiguchi et al. ................. | 342/22 |
| 4,691,204 | 9/1987 | Hiramoto ............................. | 342/22 |
| 4,706,031 | 11/1987 | Michiguchi et al. ................. | 342/22 |

OTHER PUBLICATIONS

Suzuki, "Survey on Underground Object by Means of Radio Wave", Proceedings of the Institute of Electronics and Communication Engineers of Japan, vol. 67, No. 3, Mar. 1984, pp. 308–311.

Iizuka et al., IEEE, "Detection of Nonmetallic Buried Objects by a Step Frequency Radar", vol. 71, No. 2, Feb. 1983, pp. 276–279.

Volakis et al., "Improved Identification of Underground Targets Using Video Pulse Radars by Elimination of Undesired Natural Resonances", IEEE Transactions on Antennas and Propagation, vol. AP–31, No. 2, Mar. 1983, pp. 334–340.

Usami et al., "Detection of the Underground Pipes by Synthetic Aperture Techniques", Transactions of IECE of Japan, vol. E 69, No. 4, Apr. 1986, pp. 491–493.

Primary Examiner—Thomas H. Tarcza
Assistant Examiner—Gilberto Barrón, Jr.
Attorney, Agent, or Firm—Bernard, Rothwell & Brown

[57] ABSTRACT

A system for detecting underground objects which uses reflected wave profile data collected for obtaining a detected image output and subjects the data to a sequence of synthetic aperture processing, in which set values of the dielectric constant are successively varied, and obtains the actual dielectric constant of the soil in which the targets are buried by evaluating the results of the synthetic aperture processing, whereby the need for special data collecting work only for obtaining the actual dielectric constant is eliminated.

6 Claims, 5 Drawing Sheets

SYSTEM FOR DETECTING UNDERGROUND OBJECTS

BACKGROUND OF THE INVENTION

1. Field of the Invention

The present invention relates to a system for detecting underground objects by a synthetic aperture method.

2. Description of the Prior Art

In FIG. 5 is shown a general form of a so-called synthetic aperture underground object detecting system which is structured of a general form of the synthetic aperture processing in use for satellite-radar and airborne radar and, in addition thereto, means for determination of geological constant and geological correction using the same, which is indispensable to detection of underground objects. Examples of prior art detecting systems are disclosed in a paper entitled "Underground Detection by Means of Reflected Electromagnetic Wave (Part 2)", pages 59–60, Transactions of Japan Society of Physical Sensing, October 1982, and in a paper entitled "Electromagnetic Detection of Underground Objects", pages 308–311, Proceedings of the Institute of Electronics and Communication Engineers of Japan, Vol. 67, No. 3, March 1984. In the explanatory chart of the general form in FIG. 4, ST 1 in a step of collecting reflected wave profile data, ST2 is a step of performing preprocessing in succession to step ST1, ST3 is a step of performing synthetic aperture processing in succession to step ST2, ST4 is a step of performing geological correction in succession to step ST3, and ST5 is a step of performing output processing in succession to step ST4. And ST7 is a step of collecting geological data, ST8 is a step of analytical processing of the geological data in succession to step ST7, and ST9 is a step of calculating dielectric constant $\epsilon_S$ in succession to step ST8, and the calculated dielectric constant $\epsilon_S$ is used in the aforementioned steps ST3 and ST4 for performing synthetic aperture processing and geological correction.

FIG. 5 is an explanatory drawing showing an example of the geological data collection performed at the aforesaid step ST7. Referring to the figure, reference numeral 1 denotes a target such as a pipe, 2 denotes soil in which the target 1 is buried, 3 denotes a transmitter, 4 denotes a transmitting antenna connected with the transmitter 3 for emitting a pulse signal from the transmitter 3 as an electromagnetic wave into the soil 2, 5 denotes a receiving antenna disposed at adjustable distance from the transmitting antenna 4 for receiving the reflected wave by the target 1 of the aforesaid electromagnetic wave, and 6 denotes a receiver connected with the receiving antenna 5.

The operations will be described below. First, at step ST7, geological data are collected. That is, the distance between the transmitting antenna 4 and the receiving antenna 5 are set to $Y_1$ and a monocyclic pulse, for example, is delivered from the transmitter 3. The monocyclic pulse is emitted as an electromagnetic wave by the transmitting antenna 4 into the soil 2 and its reflected wave is received by the receiving antenna 5 and sent to the receiver 6. Then, the distance between the transmitting antenna 4 and the receiving antenna 5 is changed to $Y_2$ and the transmission of the monocyclic pulse and the receipt of its reflected wave are performed again. The thus obtained geological data are analytically processed at step ST8, and thereby, the period of time $T_1$ from the transmission of the monocyclic pulse to the receipt of its reflected wave by the target 1 when the inter-antenna distance was $Y_1$ and the period of time $T_2$ from the transmission of the monocyclic pulse to the receipt of its reflected wave by the target 1 when the inter-antenna distance was $Y_2$ are obtained.

Now, representing the buried depth of the target 1 by R and the actual dielectric constant of the soil 2 by $\epsilon_S$, the following relationship holds between the period of time T from the transmission of the pulse signal to the receipt of the reflected wave by the target 1 and the inter-antenna distance Y $$T = \frac{2\sqrt{(Y/2)^2 + R^2}}{(C/\sqrt{\epsilon_S})},$$

where C is the velocity of light. Therefore, substituting the aforesaid periods of time $T_1$, $T_2$ for T, and the inter-antenna distances $Y_1$, $Y_2$ for Y, and solving the simultaneous equations having $\epsilon_S$ and R as the unknown quantities, the actual dielectric constant $\epsilon_S$ can be obtained. The actual dielectric constant $\epsilon_S$ of the soil 2 in which the target 1 is buried can thus be calculated at step ST9.

Quite independently of such a process for measuring the dielectric constant $\epsilon_S$, collection of the reflected wave profile data on a plane cutting through the soil at right angles with the ground is performed at step ST1. That is, the distance between the transmitting antenna 4 and the receiving antenna 5 is fixedly set to a predetermined value and both the antennas 4, 5 are moved in increments of a predetermined distance on the surface of the soil 2 in the direction at right angles with the direction in which both the antennas 4, 5 are disposed and transmission of a monocyclic pulse and receipt of its reflected wave are performed at every increment in the movement and thereby the reflected wave profile data on the predetermined plane cutting through the soil is obtained. In this reflected wave profile data, the reflected wave appears in the form of a hyperbola for each of the targets 1.

On the thus obtained reflected wave profile data, the monocyclic pulse propagated through the soil is distorted and largely attenuated depending on the distance it traveled, and further, it has a relatively high noise level, and therefore, the obtained reflected wave profile data is subjected to preprocessing such as filtering, level control, and the like for form shaping at step ST2.

Then, at step ST3, the thus preprocessed reflected wave profile data is subjected to synthetic aperture processing using the actual dielectric constant $\epsilon_S$ of the soil 2 calculated at the aforementioned step ST9 and thereby a certain image data is obtained. That is, as to each hyperbola on the aforementioned reflected wave profile data corresponding to each target 1, the data are made to cohere around the vertex portion, and thereby, targets sport according to weighting of their images are produced.

Since the thus obtained image data is expressed against the time scale, a geological correction is carried out at step ST4. That is, according to the fact that the propagating speed of the electromagnetic wave through the soil is inversely proportional to the square root of the dielectric constant of the soil, the scale of the aforesaid image data is converted from time scale to length scale using the actual dielectric constant $\epsilon_S$ of the soil 2 calculated at the aforesaid step ST9. The thus obtained image data expressed against the length scale is processed for outputting at step ST5 and output as a detected image output easy to observe.

Since the prior art underground object detecting system was constructed as described above, the collection of geological data required for calculation of the actual dielectric constant of the soil, in which the targets are buried, necessary for synthetic aperture processing, geological correction, etc. had to be performed as an operation completely independent of the collection of the reflected wave profile data for obtaining the detected imaage output, which has made complex the work of detecting the underground objects and this has been a problem with the prior art system.

SUMMARY OF THE INVENTION

The present invention was made to solve the above mentioned problem and it is a primary object of the present invention to provide an underground object detecting system in which the need for the special data collection only for obtaining the actual dielectric constant of soil is eliminated.

In the underground object detecting system according to the present invention, it is adapted such that suitably varied dielectric constants are set up in succession and reflected wave profile data is subjected to synthetic aperture processing using each of such set up values of the dielectric constant and the results are evaluated so as to obtain the actual dielectric constant in which the target is buried, and the synthetic aperture processing and geological correction for obtaining the output of the detected image from the aforesaid reflected wave profile data are performed using the actual dielectric constant obtained as aforesaid.

PREFERRED EMBODIMENT OF THE INVENTION

Figure 1:
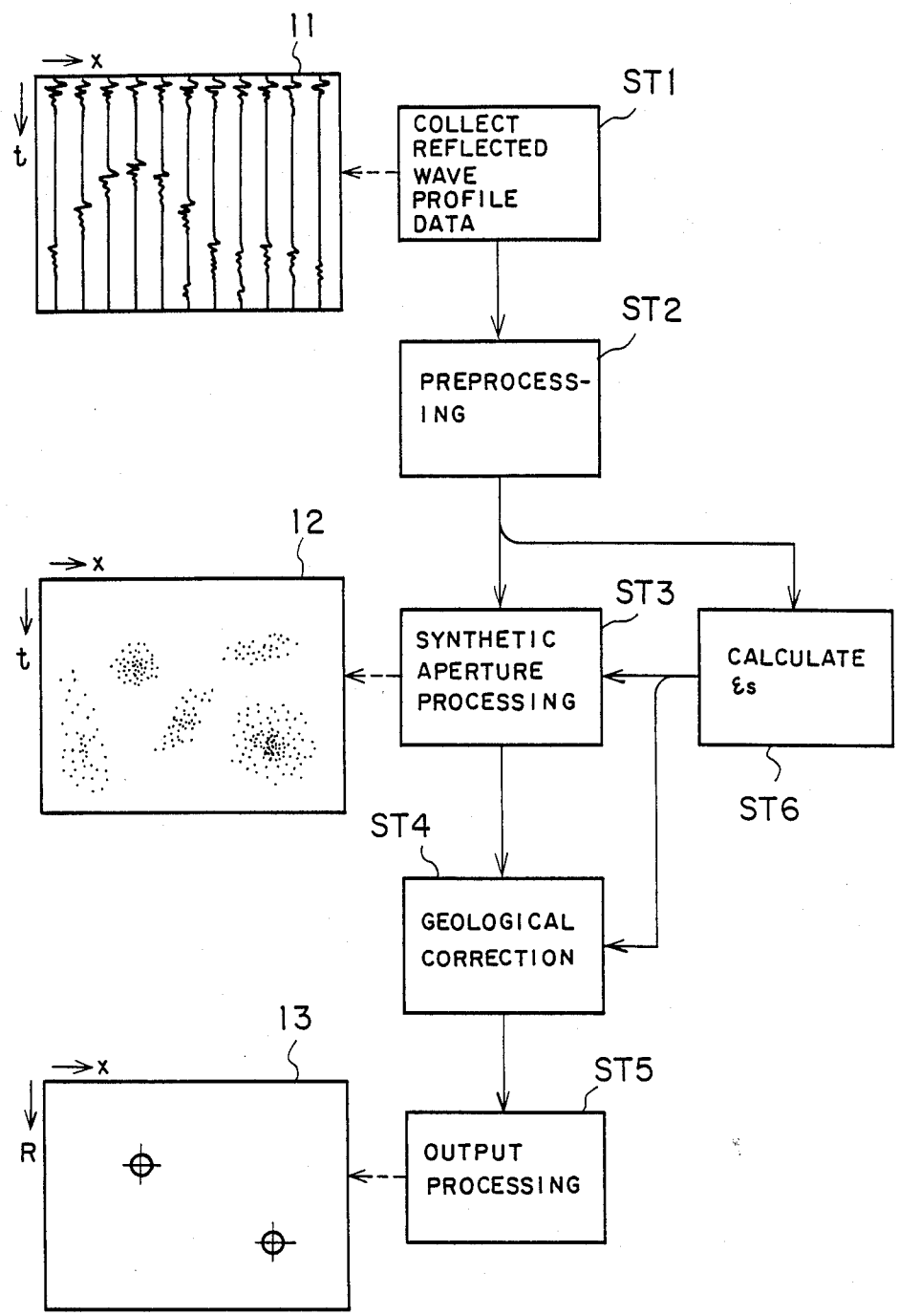
FIG. 1 is a flow chart showing an underground object detecting system according to an embodiment of the present invention.
Figure 4:
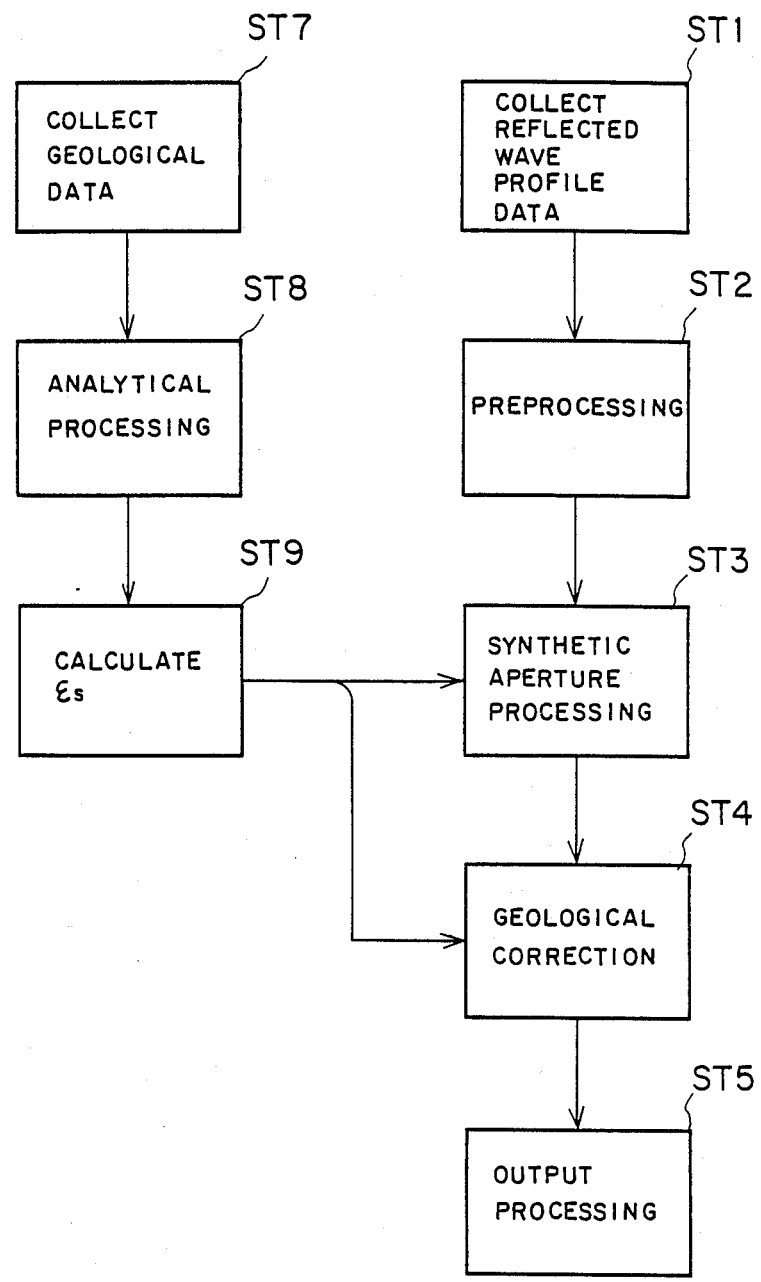
FIG. 4 is a flow chart showing a prior art underground object detecting system.

An embodiment of the present invention will be described below with reference to the accompanying drawings. Referring to FIG. 1, while ST1–ST5 are steps corresponding to ST1–ST5 of FIG. 4, ST6 is a step for calculating an actual dielectric constant of soil in which objects are buried using the reflected wave profile data preprocessed at step ST2. Diagram 11 shows reflected wave profile data collected in step ST1, diagram 12 shows image data obtained through synthetic aperture processing at step ST3, and diagram 13 shows a detected image output which is output as the result of the output processing at step ST5.

Figure 2:
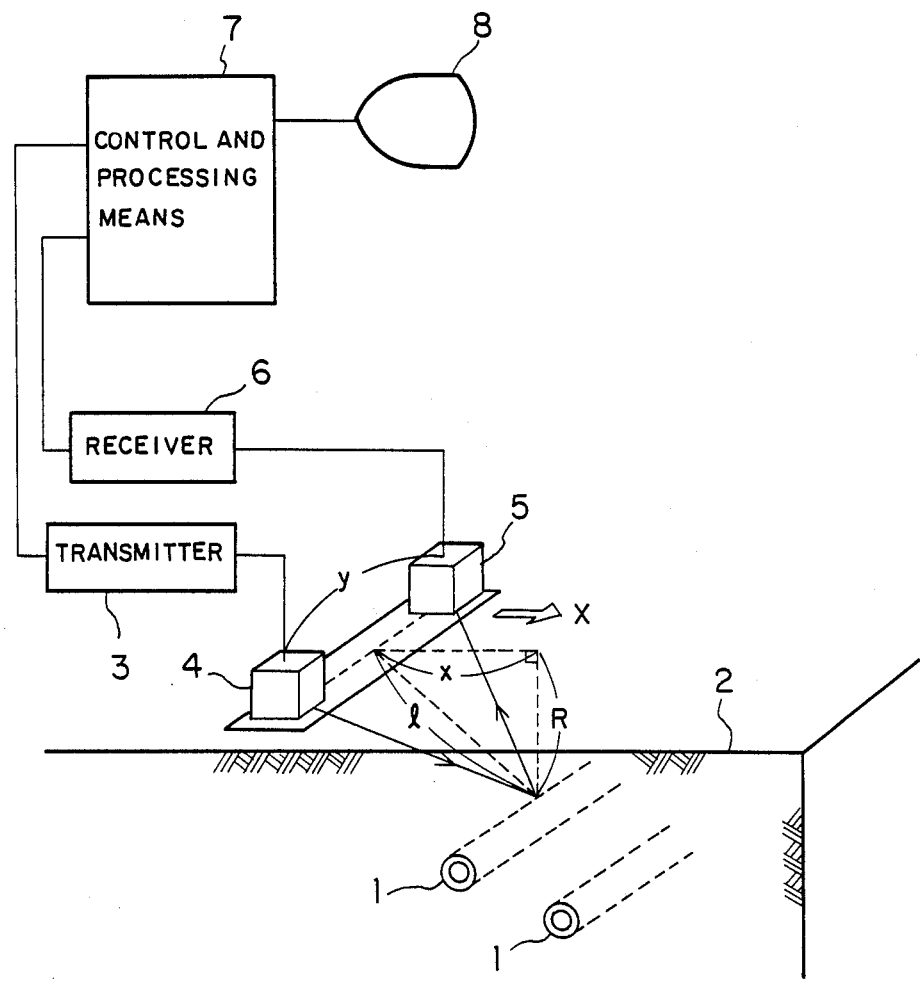
FIG. 2 is an explanatory drawing explaining collection of the reflected wave profile data.
Figure 5:
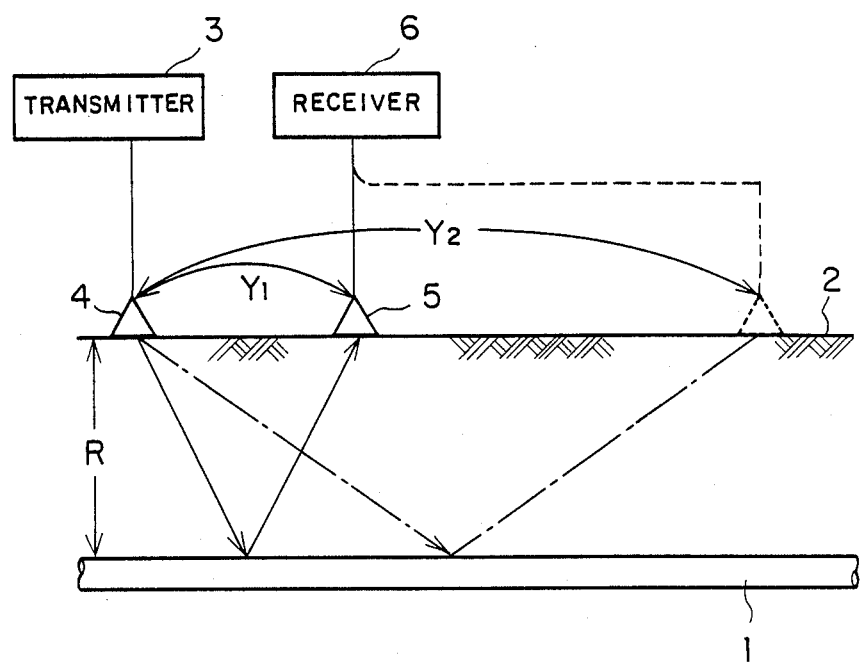
FIG. 5 is an explanatory drawing for explaining collection of geological data in the prior art system.

The operations will be described below. First, at step ST1, collection of the reflected wave profile data 11 on a plane cutting through the soil at right angles with the ground is performed. FIG. 2 is an explanatory drawing explaining the collection of the reflected wave profile data. Referring to the figure, reference numerals 1–6 denote parts corresponding to the prior art parts denoted by corresponding reference numerals in FIG. 5. And 7 denotes controlling and processing means applying synthetic aperture processing to the reflected wave profile data for producing the detected image output of the targets and 8 denotes output display means for displaying the detected image output and others. The transmitting antenna 4 and the receiving antenna 5 are fixedly held at a predetermined mutual distance y and adapted to move in increments of a predetermined distance in a direction at right angles with the direction in which both the antennas 4, 5 are disposed as indicated by the arrow X. A monocyclic pulse, for example, is emitted from the transmitting antenna 4 at every increment in the movement and its reflected wave is received by the receiving antenna 5. Therefore, the reflected wave from the target 1 is received in the shortest period of time when both the transmitting antenna 4 and the receiving antenna 5 are directly above the target 1 and the time becomes longer according as the antennas separate from the position right above the target. Representing the depth of the target 1 by R, the mutual distance of both the antennas 4, 5 by y, the dielectric constant of the soil 2 in which the target 1 is buried by $\epsilon_S$, and the velocity of light by C, the following relationship holds between the distance x from the position on the ground just above the target 1 to the line connecting both the antennas (hereinafter, to be called the antenna position) and the period of time t until the reflected wave returns $$t = \frac{2\sqrt{x^2 + R^2 + (y/2)^2}}{(C/\sqrt{\epsilon_S})}.$$

The above equation can be transformed into $$\frac{t^2}{\left(\frac{2\sqrt{\epsilon_S}}{C}\sqrt{R^2 + y^2/4}\right)^2} - \frac{x^2}{(\sqrt{R^2 + y^2/4})^2} = 1.$$

This equation represents a hyperbola of which the vertex (the negative domain of the time axis is excluded) is expressed as $$tp = \frac{2\sqrt{\epsilon_S}}{C}\sqrt{R^2 + y^2/4},$$

and asymptotic lines are expressed as $$t = \pm \frac{2\sqrt{\epsilon_S}}{C} x.$$

The reflected wave profile data shown in diagram 11 of FIG. 1 is for the case where the two targets 1 are buried and there appear waveforms due to direct coupling from the transmitting antenna 4 to the receiving antenna 5 close to the upper edge.

Then, the thus obtained reflected wave profile data is preprocessed the same as in the prior art at step ST2, so that noises are removed therefrom, distortions are reduced, and the level is adjusted.

Thereafter, from the preprocessed reflected wave profile data, actual dielectric constant $\epsilon_S$ of the soil 2 in which the targets 1 are buried is calculated at step ST6. That is, at step ST6, first, the set value of the dielectric constant is sequentially varied by a suitable method from its initial set value and the reflected wave profile data is subjected to synthetic aperture processing using each of the set values so as to obtain the respective image data. Since the form of the hyperbola varies with the change of the dielectric constant as mentioned above, the forms of the hyperbolas largely differ from each other while the set value of the dielectric constant is held apart from the actual dielectric constant $\epsilon_S$ of the soil 2, and then, even if the synthetic aperture processing is applied to them, the result is such that only a small portion of data is made to cohere around the vertex portion and the target spot on the image data remains very low. However, as the set value comes closer to the actual dielectric constant $\epsilon_S$, the forms of the hyperbolas become alike, and when the former become equal to each other, the latter come to agree with each other, when the greater portion of data is caused to cohere around the vertex portion and high and sharp target spots are obtained on the image data. By evaluating the sharpness of the target spots, the actual dielectric constant $\epsilon_S$ of the soil 2 is determined. As the method for evaluating the sharpness of the target spots, there can be considered various ways such as slicing the target spots at a predetermined level and taking the ratio of the base area to the height, or normalizing the height of the target spots between each of the image data at the same value and comparing the volume. A practical example of the method for the evaluation will be described in the following.

Figure 3:
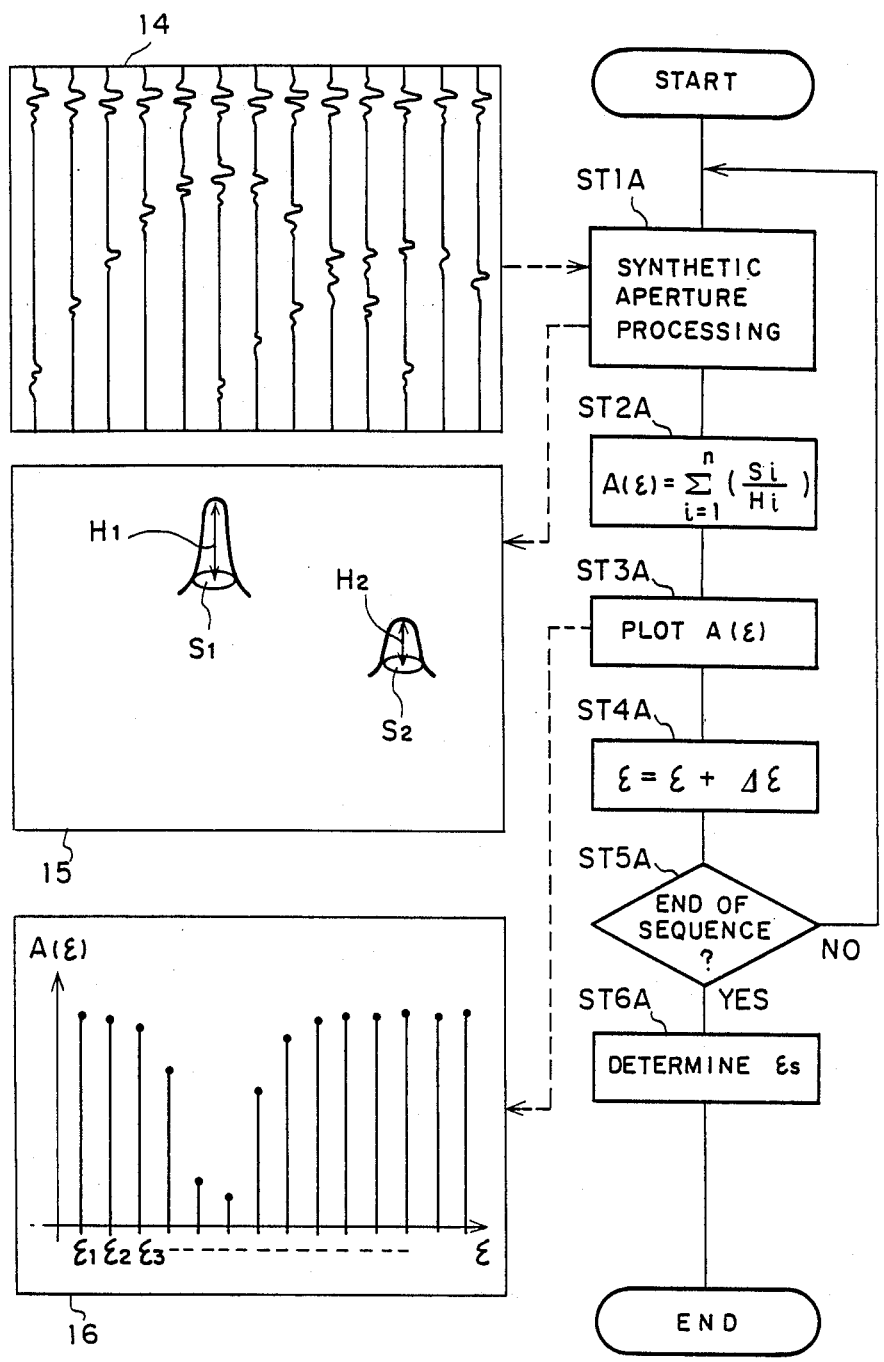
FIG. 3 is a flow chart showing the processes for obtaining a dielectric constant through evaluation of sharpness of target spots in an embodiment of the present invention.

Referring to FIG. 3, ST1A is a step of applying synthetic aperture processing to reflected wave profile data, ST2A is a step of calculating the value of a focus evaluation function $A(\epsilon)$ in succession to step ST1A, ST3A is a step of plotting the calculated values of the focus evaluation function $A(\epsilon)$ in succession to step ST2A, ST4A is a step of increasing the tentative dielectric constant $\epsilon$ by a predetermined increment $\Delta\epsilon$ in succession to step ST3A, ST5A is a step of detecting an end of the sequence in succession to step ST4A, and ST6A is a step of determining the dielectric constant $\epsilon_S$ in succession to step ST5A, in which a branch from the aforesaid step ST5A is returned to the process at step ST1A.

Diagram 14 shows the reflected wave profile data for use in the synthetic aperture processing at step ST1A, diagram 15 shows the image data obtained through the synthetic aperture processing, and diagram 16 shows the result of plotting of the calculated values of the focus evaluation function $A(\epsilon)$ at step ST3A.

The operations will be described below. First, at step ST1A, the synthetic aperture processing is applied to the reflected wave profile data 14 using the initially set tentative dielectric constant $\epsilon$, whereby the image data 15 is obtained. Here, while the tentative dielectric constant $\epsilon$ is far from the actual dielectric constant $\epsilon_S$ of the soil 2, the forms of the hyperbolas are not regular and therefore are greatly different from each other, only a small portion of data can be made to cohere around the vertex portion even if the synthetic aperture processing is executed, and the target spots on the image data 15 remain very low. However, as the tentative dielectric constant $\epsilon$ comes closer to the actual dielectric constant $\epsilon_S$ of the soil 2, the forms of the hyperbola become more and more alike, and when both the constants become equal, the forms of the hyperbolas come to coincide with each other, the greater portion of data comes to cohere around the vertex portion, and very high target spots are thereby formed on the image data 15.

At step ST2A, only positive ones of such target spots are noticed, their base areas $S_i$ at a predetermined level and their heights $H_i$ from the predetermined level are obtained, the value of a focus evaluation function defined by summation of the ratios of both of these values for all the pertinent target spots $$A(\epsilon) = \sum_{i=1}^{n} (S_i/H_i)$$

is calculated for each tentative dielectric constant $\epsilon$ and such calculated values are plotted at step ST3A. Thereafter, the aforementioned procedures are repeated by increasing the tentative dielectric constant $\epsilon$ by a predetermined increment $\Delta\epsilon$ each time at step ST4A until an end is detected at step ST5A, i.e., for example, until the tentative dielectric constant $\epsilon$ reaches a predetermined value.

Upon detection of the end at step ST5A, the minimum value of the focus evaluation function $A(\epsilon)$ plotted at the aforesaid step ST3A as shown in diagram 16 of FIG. 3 is sought and the value of the tentative dielectric constant providing the minimum value is determined to be the dielectric constant $\epsilon_S$ of the soil 2 in which the targets 1 are buried.

Although the case where only the target images of positive polarity are used for obtaining the focus evaluation function is shown in the foregoing, only the target images of negative polarity, average value of those of positive polarity and those of negative polarity, or absolute values of the target spots may be used if the target images of positive polarity and the target images of negative polarity will not cancel each other in calculating the focus evaluating function, or the evaluation function may be such that the dielectric constant $\epsilon_S$ of soil is determined by its maximum value.

Referring to FIG. 1 again, the actual dielectric constant $\epsilon_S$ of the soil 2 obtained at step ST6 is used at step ST3 for synthetic aperture processing of the reflected wave profile data preprocessed at step ST2. That is, the data of each hyperbola on the reflected wave profile data are made to cohere around the vertex portion whereby image data indicating the target spot according to weighting of their images as shown in diagram 12 is obtained. In the image data 12, the weighting of the images of each target spot is represented by the density of the black spots.

The axis of the ordinate of the thus obtained image data 12 is in the time scale, and so, to convert this into the length scale to indicate the buried depths of the targets 1, a geological correction is performed at step ST4. That is, using the actual dielectric constant $\epsilon_S$ of the soil 2 calculated at step ST6, the propagating velocity in the soil 2 of electromagnetic wave is obtained, and based upon this, the scale of the image data 12 is converted from time scale to length scale. The image data whose scale is converted from time scale to length scale is subjected to an outputting process at step ST5 and displayed on output display means 8 as a detected image output in which symbols indicating presence of the targets 1 are indicated at the positions of the target spots and thereby made easy to observe as shown in diagram 13 of FIG. 1.

The present embodiment was described above with respect to the case where preprocessed data are used as the reflected wave profile data for both the calculation of the actual dielectric constant $\epsilon_S$ and the synthetic aperture processing, but unpreprocessed, or row, reflected wave profile data may be used for either one or both of the processes.

According to the present invention reflected wave profile data collected for obtaining the detected image output are subjected to a sequence of synthetic aperture processing in which the set values of the dielectric constant are successively varied, the actual dielectric constant of the soil in which the targets are buried is obtained by evaluating the results of the aforesaid synthetic aperture processing, and synthetic aperture processing and geological correction are executed using the thus obtained actual dielectric constant so as to obtain the detected image output of the targets, and therefore, the need for special data collecting work only for obtaining the actual dielectric constant of the soil can be eliminated.

What is claimed is:

1. A system for detecting underground objects including:
    means for collecting reflected wave profile data on a plane cutting through soil at right angles with the ground by having a transmitting antenna and a receiving antenna held at a predetermined mutual distance and moved in increments of a predetermined distance on the ground in a direction virtually at right angles with the direction in which the antennas are disposed, said receiving antenna at every increment in the movement receiving the wave reflected by the object of a pulse signal emitted into the soil by said transmitting antenna;
    controlling and processing means for subjecting said reflected wave profile data to synthetic aperture processing to produce a detected image output of the targets; and
    output display means for displaying said detected image output; wherein
    said controlling and processing means comprises:
        means for suitably varying the dielectric constant to be set therein and performing synthetic aperture processing of said reflected wave profile data for each set value of the dielectric constant;
        means for evaluating results of said processing to obtain the actual dielectric constant of the soil in which the targets are buried;
        means for performing synthetic aperture processing of said reflected wave profile data using said obtained actual dielectric constant to obtain image data with respect to a time scale; and
        means for converting the scale of said image data from time scale to length scale through geological correction using said actual dielectric constant, processing for outputting of the image data with respect to the length scale to obtain a detected image output of the targets, and delivering the same to said output display means.

2. A system for detecting underground objects according to claim 1, wherein said means for obtaining an actual dielectric constant of soil establishes a focus evaluation function based upon the ratio of the base area at a predetermined level to the height from the predetermined level of target spots on image data obtained by synthetic aperture processing of reflected wave profile data performed for each set value of the dielectric constant and determines the dielectric constant of the soil in which the targets are buried from the extreme value of the focus evaluation function.

3. A system for detecting underground objects according to claim 2, wherein said focus evaluation function is established only using said target spots of positive polarity.

4. A system for detecting underground objects according to claim 2, wherein said focus evaluation function is established only using said target spots of negative polarity.

5. A system for detecting underground objects according to claim 2, wherein said focus evaluation function is estabished based upon the average of said target spots of positive polarity and of negative polarity.

6. A system for detecting underground objects according to claim 2, wherein said focus evaluation function is established based upon absolute values of said target spots.

* * * * *

UNITED STATES PATENT AND TRADEMARK OFFICE
CERTIFICATE OF CORRECTION

PATENT NO. : 4,839,654

DATED : June 13, 1989

INVENTOR(S) : Masaaki Ito et al.

It is certified that error appears in the above identified patent and that said Letters Patent is hereby corrected as shown below:

On the first page, in the list of inventors, "Aiko Jitumori" should be --Akio Jitsumori--.

Column 2, line 59, "sport" should be --spots--.

Column 3, line 13, "imaage" should be --image--.

Signed and Sealed this

Twenty-first Day of May, 1991

Attest:

HARRY F. MANBECK, JR.

Attesting Officer

Commissioner of Patents and Trademarks